(No Model.) 2 Sheets—Sheet 1.

C. H. STRATTON.
JUMP SEAT VEHICLE.

No. 457,883. Patented Aug. 18, 1891.

Witnesses
H. D. Nealy.
E. Lawler.

Inventor
C. H. Stratton,
By his Attorney
J. R. Drake.

(No Model.) 2 Sheets—Sheet 2.

C. H. STRATTON.
JUMP SEAT VEHICLE.

No. 457,883. Patented Aug. 18, 1891.

Witnesses
H. D. Nealy.
E. Lessler

Inventor
C. H. Stratton,
By his Attorney
J. R. Drake

UNITED STATES PATENT OFFICE.

CHARLES H. STRATTON, OF BUFFALO, NEW YORK.

JUMP-SEAT VEHICLE.

SPECIFICATION forming part of Letters Patent No. 457,883, dated August 18, 1891.

Application filed June 4, 1891. Serial No. 395,031. (No model.)

*To all whom it may concern:*

Be it known that I, CHARLES H. STRATTON, a citizen of the United States, residing at Buffalo, in the county of Erie and State of New York, have invented certain new and useful Improvements in Jump-Seat or Convertible Vehicles; and I do hereby declare the following to be a full, clear, and exact description of the invention, such as will enable others skilled in the art to which it appertains to make and use the same.

This invention relates to improvements in buckboards, wagons, or other vehicles called "convertible," where a jump-seat is so arranged that by shifting the vehicle can be changed at pleasure into a one-seated, two-seated, or three-seated carriage, the object of the invention being to make the seats all the same size, thereby giving full seating capacity for two, four, or six persons; also, to adjust the seats so as to give the necessary space between them and balance the weight evenly upon the springs when three seats are used; and the invention as constructed will be understood by the following specification and claims, in connection with the accompanying drawings, in which—

Figure 1:
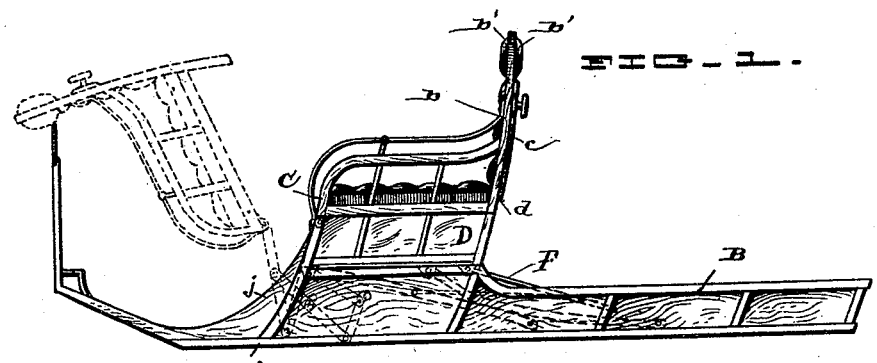
Figure 2:
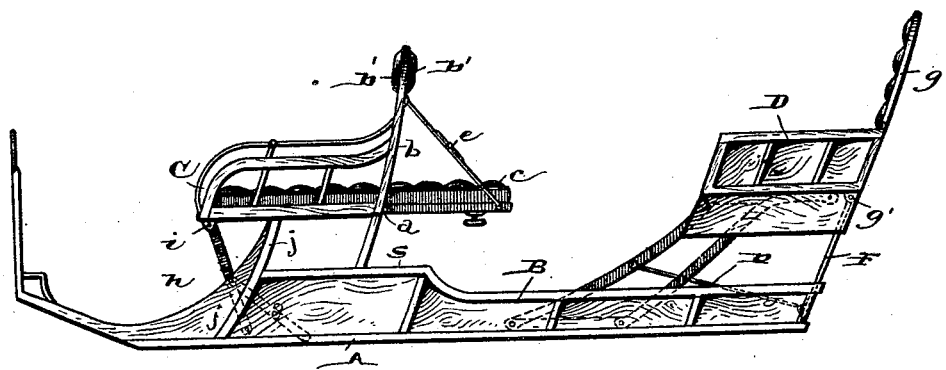
Figure 3:
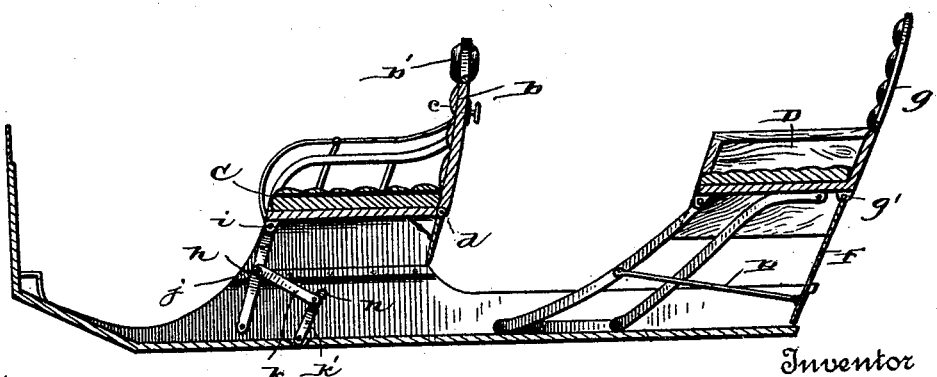
Figure 4:
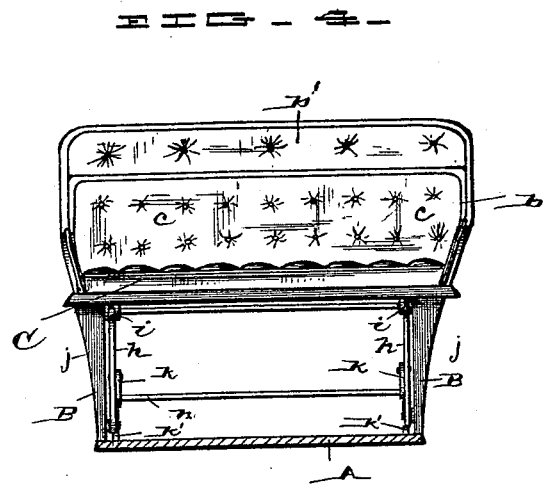
Figure 5:
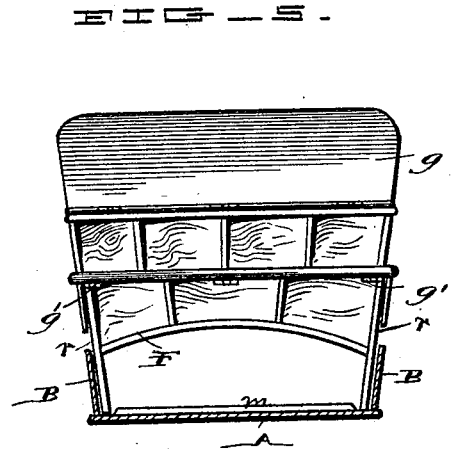

Figure 1 is a side elevation of a one-seated wagon, showing the position of the back seat jumped under the front seat, the front seat in dotted lines when thrown clear forward; Fig. 2, a side elevation with the dos-a-dos seat down, the front seat shoved forward, and the back seat in position, making a full three-seated vehicle; Fig. 3, a side elevation, partly in section, as an ordinary two-seated vehicle, the dos-a-dos seat shut up, making the full lazy-back of front seat; Fig. 4, a front view of front seat with the locking-rod, &c.; Fig. 5, a back view of the back seat and its panel-support.

A represents the bottom of the vehicle, and B its sides; C, the front seat, and D the back seat. The space under the front seat C is filled at the sides by the side panels of the back seat D when folded under, as in Fig. 1.

The front seat C has two stationary frames or pillars $b\ b$ and a top back-rest $b'$, forming part of the lazy-back. The rest of the lazy-back, which shuts up between these pillars and the part $b'$, is let down therefrom by hinges $d$ $d$ at its junction with the back of the seat, and, when down, is held in place by side arms $e\ e$, jointed in the middle and pivoted or hinged at the ends, so as to fold inward when the seat is raised and fastened up by a catch. This forms the back-to-back seat $c$ to the front seat C, as in Figs. 1, 2, 3, and 4.

The back seat D is connected to the bottom of the wagon by means of four jumping-irons, which at their lower ends are pivoted to suitable supports and their upper ends to hangers or ears secured to the under side of the seat, substantially as shown. Nothing is claimed as new in these jumping-irons.

The invention in the back seat consists in the combined panel and seat support F, hinged at $g\ g$ to the under side, at the rear, to the back seat D, the side posts $r\ r$ of the panel F resting on the bottom A of the vehicle, as shown in Figs. 2, 3, and 5. This makes not only an ornamental back, but closes up the rear end of the vehicle, and when folded under the front seat covers the jumping-irons. (Partly shown in Fig. 1.) This panel-support F is kept in place by two side rods $p\ p$, running from the panel to the first jump-iron, being hinged or pivoted to both, as shown, so that any movement of the seat forward or back carries the panel with it, and is fully shown in Figs. 2 and 3.

When all three seats are used, it is necessary that the space between the front and back seat be increased, so that those sitting on the dos-a-dos do not incommode those sitting on the back seat. This I accomplish by sliding or setting the front seat forward a short distance, as follows: A side iron $h$ is hinged to the under side of the edge of the front seat at $i$, (one each side,) its lower end pivoted to the inside of a wooden post $j$, one of the front seat-supports on which the front seat rests, as in Figs. 1, 2, and 4. About midway of this iron is pivoted at $h'$ another shorter iron $k$, and to this a shorter iron $k'$, Fig. 3, its lower end pivoted to the side of the wagon, as shown. By means of these pivoted irons the seat is moved forward the distance required, (indicated at $s$, Fig. 2,) giving so much additional space between the dos-a-dos and back seat.

The whole front seat can be thrown over forward, as indicated in dotted lines, Fig. 1. To fasten the front seat in place when set forward, a cross-rod $n$, forming part of the short iron $k'$, is pulled down till it rests against the edges of the irons k k, and thus locks them down. To set the seat back, a pull on the rod n draws the whole back to the seat's normal position.

m, Fig. 5, indicates the toe-rod across the bottom for those sitting on the dos-a-dos seat.

I claim—

1. In a vehicle, the front seat C, provided with the stationary pillars b b and stationary lazy-back rest b', and a movable lazy-back c, hinged to the seat at d d, adapted to let down, forming a dos-a-dos seat, and held by arms e e, all substantially as specified.

2. In combination with the front seat C, having a dos-a-dos seat c, the side irons h h, hinged to the under front edge of the seat C and pivoted at their lower ends to the posts j j, the intermediate links k, and combined link and locking irons k' r, all arranged and operating substantially as and for the purpose specified.

3. In combination with a jump-seat D, provided with its pivoted jump-irons, the back panel-support F r r, hinged to the rear of the seat D and having the side connecting-rods p p, pivoted to the panel F and to the front jump-irons, relatively arranged, so as to be carried forward or back by the moving of the seat, all substantially as specified.

In testimony whereof I affix my signature in presence of two witnesses.

CHARLES H. STRATTON.

Witnesses:
J. R. DRAKE,
JOHN F. BURKE.